United States Patent [19]

Orler et al.

[11] Patent Number: 5,020,887
[45] Date of Patent: Jun. 4, 1991

[54] CONFORMALLY DOPED OPTICAL ELEMENTS

[75] Inventors: Anthony J. Orler, Redondo Beach; Lowell M. Hobrock; Barret Lippey, both of Los Angeles, all of Calif.

[73] Assignee: Hughes Aircraft Company, Los Angeles, Calif.

[21] Appl. No.: 405,785

[22] Filed: Sep. 11, 1989

[51] Int. Cl.$^5$ ............................................... G02B 3/00
[52] U.S. Cl. .................................... 350/409; 350/1.7; 350/413; 350/417
[58] Field of Search ................. 350/413, 1.7, 409, 417

[56] References Cited

U.S. PATENT DOCUMENTS 4,871,220 10/1989 Kohin .................................... 350/1.7

Primary Examiner—Scott J. Sugarman
Attorney, Agent, or Firm—William J. Streeter; Wanda K. Denson-Low

[57] ABSTRACT

Optical elements, such as windows for forward-looking, infrared radiation-receiving devices have at least one substantially flat surface adapted for exposure to incident radiation and, within such elements, one or more doped regions having predetermined, desired, non-flat shapes or having doping concentrations. These doped regions are adapted for exposure to the same incident radiation, and are also adapted to reflect, refract or scatter one or more predetermined, desired wavelengths of the incident radiation while transmitting other predetermined, desired wavelengths of the same incident radiation. Methods for making these devices include growing the doped regions on the preformed surface of optical element blocks; immersing such blocks in a molten bath of the material from which the dopant is made; and placing one or more doped inserts into a preformed region of an optical element block.

18 Claims, 3 Drawing Sheets

CONFORMALLY DOPED OPTICAL ELEMENTS

BACKGROUND OF THE INVENTION

1. Field of the Invention

This invention relates to optical elements such as windows for forward-looking, infrared radiationreceiving devices that have at least one substantially flat surface adapted for exposure to incident radiation, and, within such elements, one or more doped regions having predetermined, desired, non-flat shapes or having doping concentrations that are positioned for exposure to incident radiation and adapted to focus, reflect, refract or scatter predetermined, desired wavelengths of incident radiation while transmitting other predetermined wavelengths of the incident radiation.

2. Description of Related Art

Until now, forward-looking, infrared-transmitting optical elements were required to have non-flat surfaces adapted for exposure to radiation to focus, scatter and reflect radiation such as radar while transmitting infrared radiation. Such optical elements undesirably cause some of the infrared radiation to be refracted, reflected or scattered, which limits the practicable range of curvatures acceptable for such optical elements. Further, such elements frequently produce aberrant transmissions and require additional optical elements to correct for these aberrations.

SUMMARY OF THE INVENTION

This invention provides optical elements that include at least one flat surface adapted for exposure to incident radiation and, in preferred embodiments, a second flat surface parallel to and spaced from the first substantially flat surface Within these optical elements is at least one doped region having a predetermined, desired, non-flat shape adapted for exposure to the same incident radiation as the flat surface of the optical element, but adapted to reflect, refract or scatter at least that portion of the incident radiation having wavelengths in a first predetermined, desired range while transmitting radiation having wavelengths in a second predetermined, desired range Such doped regions, in preferred embodiments, extend to, but not beyond the substantially flat surfaces adapted for exposure to incident radiation.

The doped region may, in alternative embodiments, have a predetermined, desired doping concentration, and in such embodiments, these doped regions may themselves have a flat surface adapted for exposure to the incident radiation. In still other alternative embodiments, at least one of the doped regions, and preferably more than one of these regions, may have both a predetermined, desired non-flat shape, a predetermined desired doping concentration, or both.

In preferred embodiments, the optical element is a window adapted for exposure to incident radiation that includes infrared and radar radiation. These elements are adapted to transmit substantially all incident infrared radiation, but to scatter, refract , absorb, focus or reflect substantially all or at least a substantial part of incident radar radiation. Such preferred embodiments have at least one doped region with a curved shape, and may have a plurality of such regions with curved shapes that have substantially the same curvature or that differ in curvature from one another.

In preferred embodiments, the number, shape and dopant concentration of the doped regions are sufficient to reduce retroflection of incident radiation that passes through the optical element, and thereafter comes into contact with another surface.

This invention also relates to methods for making these optical elements In one such method, a substrate is formed to the desired shape for the doped region, and doping material is then grown onto this surface by chemical vapor deposition, molecular beam epitaxy deposition, or another method. After formation of one or more doped regions of predetermined desired shape, concentration, or both, the surface of the element is reduced in thickness by cutting, polishing or other appropriate steps, to the extent necessary to bring the surface of one or more of the doped regions tangential to, but not beyond the substantially flat surface adapted to be exposed to incident radiation.

Alternatively, the optical elements can be made by forming one or more openings of desired shape and size in an optical element block, and then placing the block into a molten mass of the same material from which the block is formed to form a single element having two distinct regions with an internal gradient surface between them.

Alternatively, the doped region can be formed by inserting a cast doped element into an optical block element having one or more openings of desired shape and size, as by a casting process.

BRIEF DESCRIPTION OF THE DRAWINGS

This invention can better be understood by reference to the accompanying drawings, in which.

DESCRIPTION OF THE PREFERRED EMBODIMENTS

Figure 1:
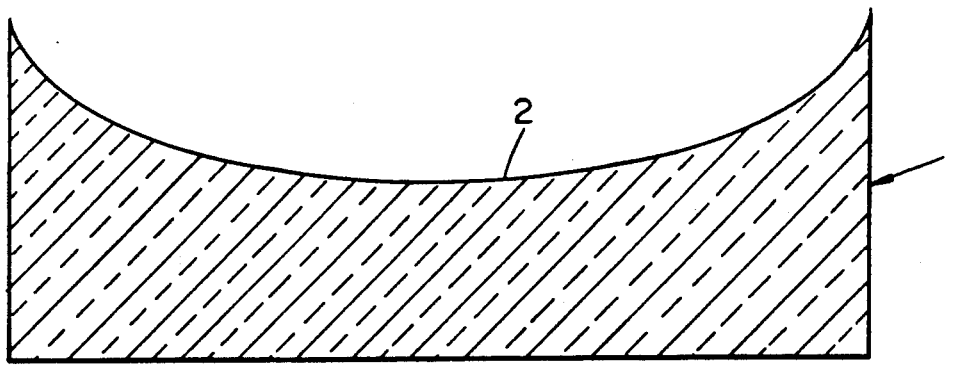
FIG. 1 shows a curved substrate surface formed to receive a doped region.
Figure 2:
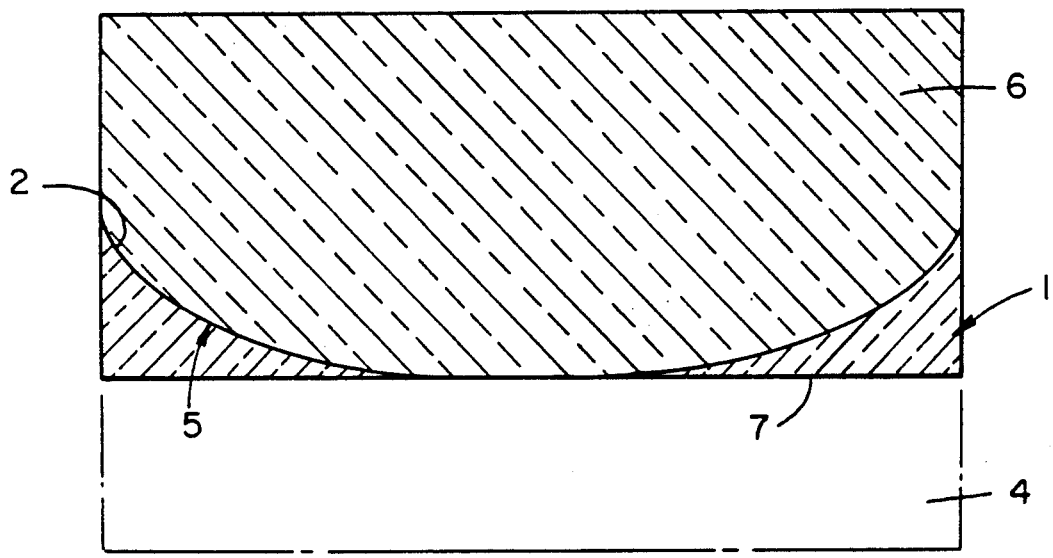
FIG. 2 shows the substrate of FIG. 1 after a doped region has been formed on the curved surface.
Figure 3:
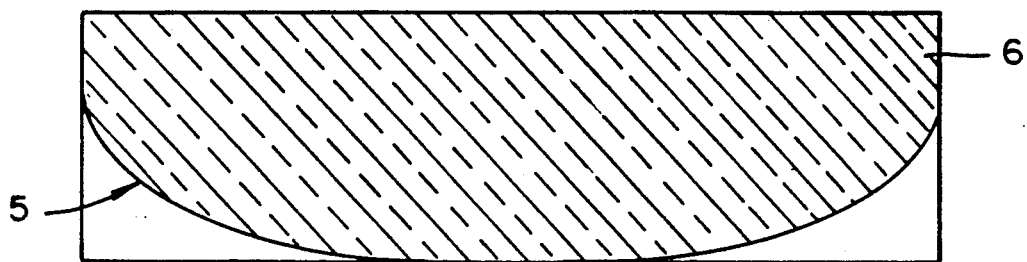
FIG. 3 shows the optical element formed in FIG. 2 after the surface of the block has been reduced in thickness to bring the doped region into contact with the flat surface of the optical element.

FIGS. 1-3 illustrate the formation of a doped region of predetermined desired shape, here a curved shape, in a flat-surfaced optical element. FIG. 1 shows the formation of curved surface 2 of predetermined desired shape in an optical element block 1 made of silicon or germanium or other semiconductive material.

FIG. 2 shows the formation of a single doped region in substrate 1. This doped region 6 can be formed by chemical vapor deposition, molecular beam epitaxy, crystal growing from a melt vacuum deposition, or a combination of these or other steps. Doped region 6 could alternatively be formed by inserting substrate 1, shown in FIG. 1, into a molten bath of the material from which substrate 1 is made to form one or more doped regions.

FIG. 3 shows the removal of portion 4 of optical element 1, as by cutting or polishing, to bring surface 5 of the doped region into tangential or other desired contact with substantially flat surface 7 of optical element 1.

Figure 4:
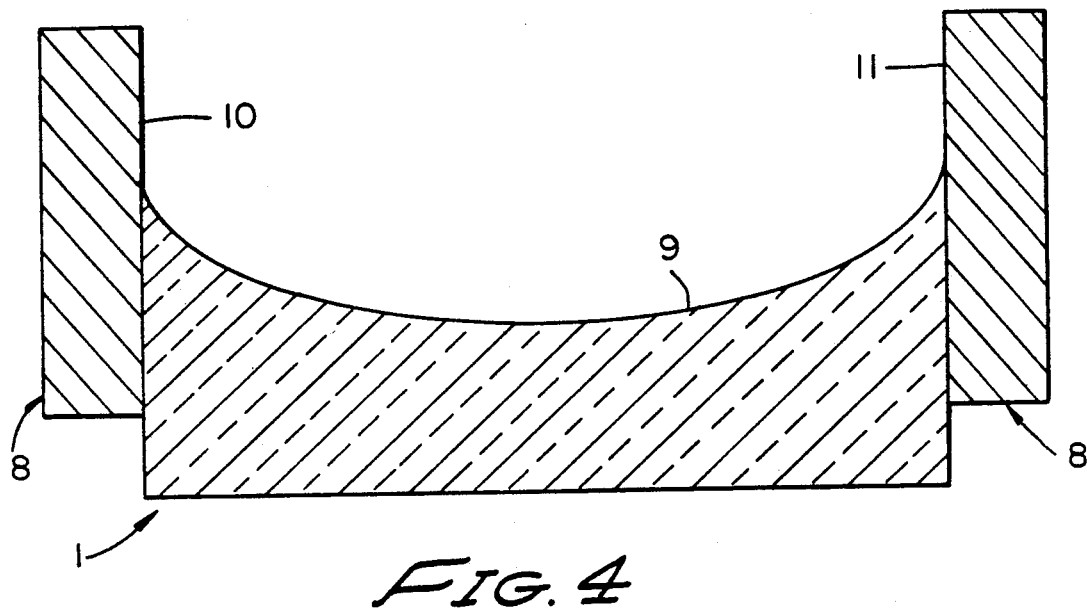
FIG. 4 shows, in schematic form, an optical element substrate placed in a casting mold for formation of a doped region therein.

FIG. 4 shows the use of mold 8 with optical element 1 to facilitate formation of a doped region by pouring a molten material onto curved surface 9 with mold elements 10 and 11 on each side of surface 9 to confine the molten material in curved surface 9 until the molten material cools and solidifies.

Figure 5:
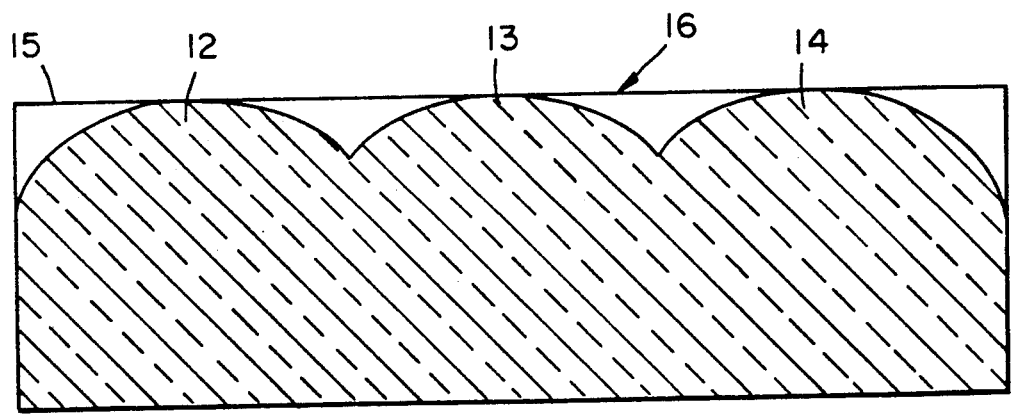
FIG. 5 shows an optical element with a plurality of doped regions of predetermined, desired, curved shape.

FIG. 5 shows an optical element such as an optical window with a plurality of curved, doped regions 12, 13 and 14, each having a predetermined, desired, curved shape with each of the curved shapes tangential to substantially flat upper surface 15 of optical element 16. The curved surfaces are shaped so as to reflect, refract, absorb, focus or scatter infrared radiation while transmitting, without reflection or refraction, substantially all infrared radiation.

Figure 6:
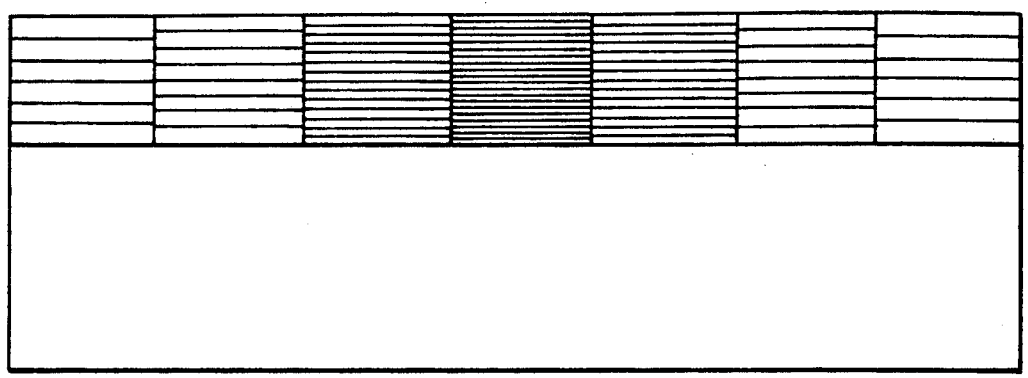
FIG. 6 shows an optical element substrate with doped regions of varying densities.

FIG. 6 illustrates, in schematic form, the formation of doped regions that differ from one another in densities by predetermined desired amounts calculated to transmit incident radiation in a predetermined desired wavelength range while selectively absorbing, focusing, scattering, reflecting or refracting substantially one or more other wavelengths of incident radiation.

Figure 7:
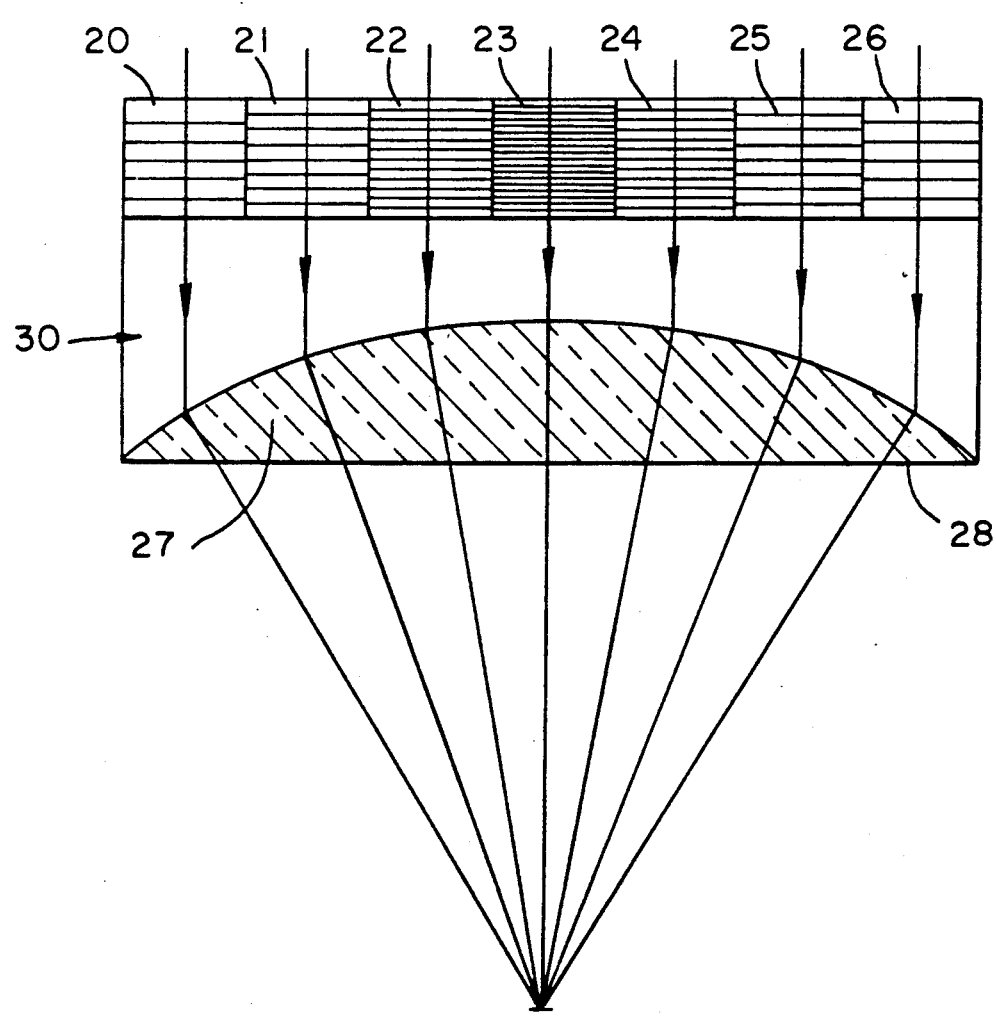
FIG. 7 shows an optical element substrate with doped regions of varying densities and a doped region of predetermined, desired, curved shape.

FIG. 7 illustrates, in schematic form, the formation in optical element 30 of doped regions 20, 21, 22, 23, 24, 25 and 26 that differ from one another in densities by predetermined desired amounts calculated to transmit incident radiation in a predetermined desired wavelength range while selectively absorbing, focusing, scattering, reflecting or refracting substantially one or more other wavelengths of incident radiation, together with a doped region 27 of predetermined, desired, curved shape with region 27 coincident with substantially flat lower surface 28 of optical element 30.

What is claimed is:

1. An optical element comprising at least one flat surface adapted for exposure to incident radiation and, within said element, at least one doped region having a predetermined, desired non-flat shape adapted for exposure to the same incident radiation as said flat surface, said doped region being adapted to reflect, focus, absorb, refract or scatter at least that portion of the incident radiation having wavelengths in a first predetermined, desired range while transmitting radiation having wavelengths in a second, predetermined, desired range.

2. An optical element comprising at least one flat surface adapted for exposure to incident radiation and, within said element, doped regions having differing predetermined desired dopant concentration profiles, said at least one doped region being adapted for exposure to the same incident radiation as the flat surface of the optical element, and being adapted to reflect, refract, focus, absorb or scatter at least that portion of the incident radiation having wavelengths in a first predetermined, desired range while transmitting radiation having wavelengths in a second, predetermined, desired range.

3. The optical element of claim 1 or claim 2 wherein said doped region extends to, but not beyond said at least one flat surface.

4. The optical element of claim 1 or claim 2 wherein said doped regions have a curved shape.

5. The optical element of claim 1 or claim 2 wherein said element includes a plurality of doped regions, each of said doped regions having a curved shape, said curved shapes being substantially the same in size and shape.

6. An optical element comprising at least one flat surface adapted for exposure to incident radiation, and, within said element, at least one doped region having a predetermined, desired, non-flat shape, and at least one doped region having a predetermined, desired dopant concentration profile, said doped regions being adapted for exposure to the same incident radiation as said flat surface, but adapted to reflect, refract, focus, absorb or scatter at least that portion of the incident radiation having wavelengths in a first predetermined, desired range while transmitting radiation having wavelengths in a second, predetermined, desired range.

7. The optical element of claim 6 wherein one of said doped regions extends to, but not beyond said at least one said flat surface.

8. The optical element of claim 1 or claim 2 or claim 6 wherein said optical element is a window adapted for exposure to incident radiation that includes infrared and radar radiation, and wherein said doped regions are adapted to transmit substantially all of said infrared radiation, but to scatter, refract or reflect a substantial part of said incident radar radiation.

9. The optical element of claim 1 or claim 2 or claim 6 wherein the number, shape and dopant concentration of said doped regions are sufficient to reduce retroflection of incident radiation that passes through said optical element and thereafter comes into contact with another surface.

10. A method for making an optical element comprising at least one flat surface adapted for exposure to incident radiation and, within said element, at least one doped region having a predetermined, desired non-flat shape adapted for exposure to the same incident radiation as said flat surface, said doped region being adapted to reflect, focus, refract or scatter at least that portion of the incident radiation having wavelengths in a first predetermined, desired range while transmitting radiation having wavelengths in a second, predetermined, desired range, said method comprising forming, in an optical element substrate, an opening of desired shape for at least one of said doped regions; growing dopant material onto said opening to form said at least one doped region; and then forming a flat surface on said optical element with the doped region extending to, but not beyond said flat surface.

11. A method of forming an optical element comprising at least one flat surface adapted for exposure to incident radiation and, within said element, at least one doped region having a predetermined, desired non-flat shape adapted for exposure to the same incident radiation as said flat surface, said doped region being adapted to reflect, focus, absorb, refract or scatter at least that portion of the incident radiation having wavelengths in a first predetermined, desired range while transmitting radiation having wavelengths in a second, predetermined, desired range, said method comprising forming one or more openings of desired shape and size in an optical element block; placing sad block into a molten mass of the material from which said block is formed to form said at least one doped region; and forming a flat surface on said optical element with said at least one doped region extending to, but not beyond said flat surface.

12. A method for making optical elements comprising at least one flat surface adapted for exposure to incident radiation and, within said element, at least one doped region having a predetermined, desired non-flat shape adapted for exposure to the same incident radiation as said flat surface, said doped region being adapted to reflect, focus, absorb, refract or scatter at least that portion of the incident radiation having wavelengths in a first predetermined, desired range while transmitting radiation having wavelengths in a second, predetermined, desired range, said method comprising inserting into an optical element block a cast doped element of desired size and shape and attaching said cast doped element to said block element.

13. An optical element comprising at least one flat surface adapted for exposure to incident radiation and, within said element, at least one doped region having a predetermined desired dopant concentration profile, said at least one doped region being adapted for exposure to the same incident radiation as the flat surface of the optical element, and being adapted to reflect, refract, focus, absorb or scatter at least that portion of the incident radiation having wavelengths in a first predetermined, desired range while transmitting radiation having wavelengths in a second, predetermined, desired range and comprising forming, in an optical element substrate, an opening of desired shape for at least one of said doped regions; growing dopant material onto said opening to form said at least one doped region; and then forming a flat surface on said optical element with the doped region extending to, but not beyond said flat surface.

14. A method of forming an optical element comprising at least one flat surface adapted for exposure to incident radiation and, within said element, at least one doped region having a predetermined desired dopant concentration profile, said at least one doped region being adapted for exposure to the same incident radiation as the flat surface of the optical element, and being adapted to reflect, refract, focus, absorb or scatter at least that portion of the incident radiation having wavelengths in a first predetermined, desired range while transmitting radiation having wavelengths in a second, predetermined, desired range, said method comprising forming one or more openings of desired shape and size in an optical element block; placing said block into a molten mass of the material from which said block is formed to form said at least one doped region; and forming a flat surface on said optical element with said at least one doped region extending to, but not beyond said flat surface.

15. A method for making an optical element comprising at least one flat surface adapted for exposure to incident radiation and, within said element, at least one doped region having a predetermined desired dopant concentration profile, said at least one doped region being adapted for exposure to the same incident radiation as the flat surface of the optical element, and being adapted to reflect, refract, focus, absorb or scatter at least that portion of the incident radiation having wavelengths in a first predetermined, desired range while transmitting radiation having wavelengths in a second, predetermined, desired range, said method comprising inserting into an optical element block a cast doped element of desired size and shape and attaching said cast doped element to said block element.

16. An optical element comprising at least one flat surface adapted for exposure to incident radiation, and, within said element, at least one doped region having a predetermined, desired, non-flat shape, and at least one doped region having a predetermined, desired dopant concentration profile, said doped regions being adapted for exposure to the same incident radiation as said flat surface, but adapted to reflect, refract, focus, absorb or scatter at least that portion of the incident radiation having wavelengths in a first predetermined, desired range while transmitting radiation having wavelengths in a second, predetermined, desired range and comprising forming, in an optical element substrate, an opening of desired shape for at least one of said doped regions; growing dopant material onto said opening to form said at least one doped region; and then forming a flat surface on said optical element with the doped region extending to, but not beyond said flat surface.

17. An optical element comprising at least one flat surface adapted for exposure to incident radiation, and, within said element, at least one doped region having a predetermined, desired, non-flat shape, and at least one doped region having a predetermined, desired dopant concentration profile, said doped regions being adapted for exposure to the same incident radiation as said flat surface, but adapted to reflect, refract, focus, absorb or scatter at least that portion of the incident radiation having wavelengths in a first predetermined, desired range while transmitting radiation having wavelengths in a second, predetermined, desired range and comprising forming one or more openings of desired shape and size in an optical element block; placing said block into a molten mass of the material from which said block is formed to form said at least one doped region; and forming a flat surface on said optical element with said at least one doped region extending to, but not beyond said flat surface.

18. An optical element comprising at least one flat surface adapted for exposure to incident radiation, and, within said element, at least one doped region having a predetermined, desired, non-flat shape, and at least one doped region having a predetermined, desired dopant concentration profile, said doped region being adapted for exposure to the same incident radiation as said flat surface, but adapted to reflect, refract, focus, absorb or scatter at least that portion of the incident radiation having wavelengths in a first predetermined, desired range while transmitting radiation having wavelengths in a second, predetermined, desired range and comprising inserting into an optical element block a cast doped element of desired size and shape and attaching said cast doped element to said block element.

* * * * *